O. SARONY.
PHOTOGRAPHIC PRINTING APPARATUS.

No. 190,253.  Patented May 1, 1877.

WITNESSES:
Solon C. Kemon
A. M. Tanner

INVENTOR:
Oliver Sarony
BY
ATTORNEYS.

UNITED STATES PATENT OFFICE.

OLIVER SARONY, OF SCARBOROUGH, ENGLAND.

IMPROVEMENT IN PHOTOGRAPHIC-PRINTING APPARATUS.

Specification forming part of Letters Patent No. 190,253, dated May 1, 1877; application filed July 28, 1876.

*To all whom it may concern:*

Be it known that I, OLIVER SARONY, of Scarborough, in the county of York, England, have invented a new and useful Improvement in Photography and Photographic Apparatus; and I do hereby declare that the following is a full, clear, and exact description of the same, reference being had to the accompanying drawing, forming part of this specification.

My invention relates to improvements in the production of the fancy borders, titles, and other devices or ornamentations beneath or around photographic pictures. It is chiefly designed for use in carbon-printing, although equally well adapted for salts-of-silver pictures.

The object of the invention is to obtain by two successive exposures the title, tint, or fancy border on the same negative with the picture, so as to dispense with the use of registering-presses and registering tinting-presses hitherto employed, and therefore with the second printing for producing the title or border on the positive, so that a print having the appearance of what is known as a "chromotype" may be produced in the ordinary printing-frame at one printing instead of two, as at present.

For the purpose of my invention I employ, by preference, a "slide-back" camera, and I fit to the plate-holder, and close in front of the sensitive plate, a slide provided with two openings, of which one is of a form and size to correspond exactly to the style and dimensions of the picture desired, so that the part of the plate which will be occupied by the border is masked. I first expose through said opening, and then through the other opening, which is of sufficient size to include both the picture and the border, and in which is fixed a plate of colorless glass or other suitable transparent material, having printed upon it (by lithography or otherwise, in vitrified colors, which are burned in) the title, fancy border, or other device it is desired to produce beneath or around the picture, a mask corresponding exactly in size and shape to the first opening being fixed upon this transparent plate in such position as to mask the part first exposed when exposing the border.

Figure 1:
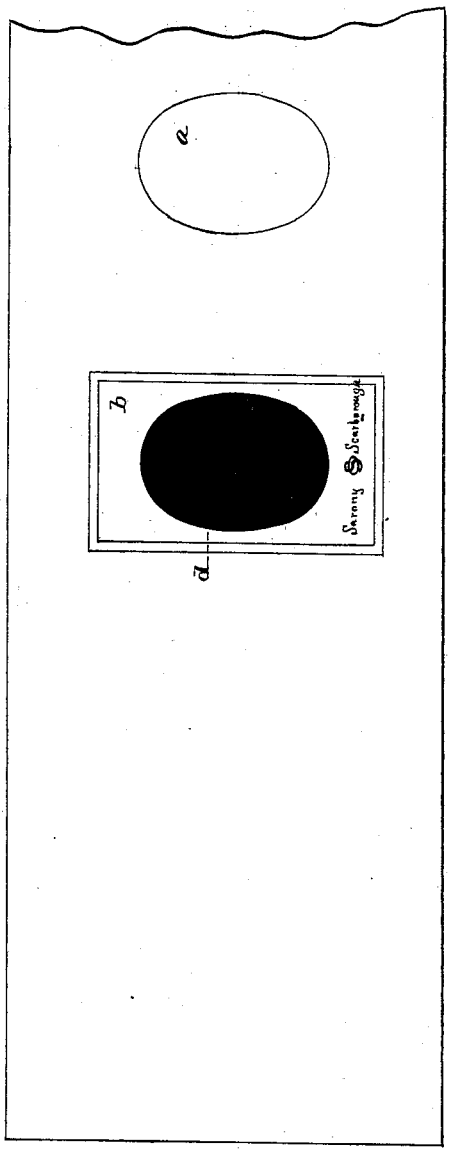

In order that my invention may be better understood, I have in the accompanying drawing, at Figure 1, shown a face view of the slide I employ with the opening above mentioned.

Figure 3:
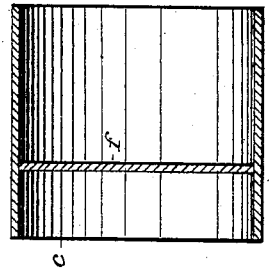
Figure 2:
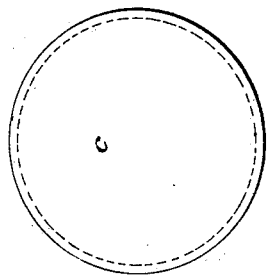

In operating according to this invention, I first adjust the slide so that the opening *a* shall register opposite the lens, and, after focusing, I expose in the ordinary way through such opening. I then place the cap on the lens, and traverse the slide to register at the other opening, *b*, which contains the glass bearing the title or other device, as before mentioned, and the mask *d* to protect the subject already photographed. I then replace the cap by one of special construction, to equalize the light and shut out exterior objects. This cap is represented in front view and section in Figs. 2 and 3. It consists of an outer covering of tissue-paper, *c*, with a piece of ground glass, *f*, placed a short distance behind the paper. I then expose for a few seconds, (the mask *d* protecting the picture already produced,) and in this manner I produce the border and title on the negative.

Having thus described my invention, what I claim as new is—

A photographic-printing apparatus, provided with a short tube having outer tissue-paper *a* and inner ground glass *f*, substantially as shown and described, to form a cap, as specified.

The above specification of my invention signed by me this 12th day of June, 1876.

OLIVER SARONY.

Witnesses:
JOHN E. T. GRAHAM,
THOMAS FULLY.